US007969905B1

(12) United States Patent
Ciavattone

(10) Patent No.: US 7,969,905 B1
(45) Date of Patent: Jun. 28, 2011

(54) CLASS-BASED DETECTION OF MICROCONGESTION ON QOS-ENABLED LINKS

(75) Inventor: Leonard Ciavattone, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 12/653,532

(22) Filed: Dec. 15, 2009

Related U.S. Application Data

(63) Continuation of application No. 11/517,732, filed on Sep. 8, 2006, now Pat. No. 7,656,796.

(51) Int. Cl.
*H04L 12/26* (2006.01)

(52) U.S. Cl. ......... 370/252; 370/230; 370/394; 370/412

(58) Field of Classification Search .................. 370/230, 370/235, 252, 412; 709/223, 230, 232
See application file for complete search history.

(56) References Cited

U.S. PATENT DOCUMENTS

| 6,622,172 | B1 * | 9/2003 | Tam ............................... 709/232 |
| 6,868,094 | B1 * | 3/2005 | Bordonaro et al. ........... 370/516 |
| 7,088,677 | B1 * | 8/2006 | Burst, Jr. ....................... 370/229 |
| 2003/0185210 | A1 * | 10/2003 | McCormack ................ 370/392 |
| 2005/0086362 | A1 * | 4/2005 | Rogers .......................... 709/235 |
| 2005/0180327 | A1 * | 8/2005 | Banerjee et al. .............. 370/236 |
| 2006/0227713 | A1 * | 10/2006 | Zuberi et al. ................. 370/241 |
| 2008/0137540 | A1 * | 6/2008 | Botvich ........................ 370/241 |

* cited by examiner

*Primary Examiner* — Ricky Ngo
*Assistant Examiner* — Rasheed Gidado

(57) ABSTRACT

This is a method for use in detecting and measuring microcongestion on links where QoS is utilized to provide a prioritized packet delivery service. Microcongestion is a transient condition that occurs over extremely short periods of time and is generally invisible to the end user. However, the ability to monitor the frequency and severity of microcongestion can help identify link capacity issues with far greater accuracy than standard passive measurements and at a much earlier stage than traditional active measurements. This capability can be particularly valuable on very-high-speed links where even small periods of perceptible congestion can represent a significant number of queued packets.

8 Claims, 7 Drawing Sheets

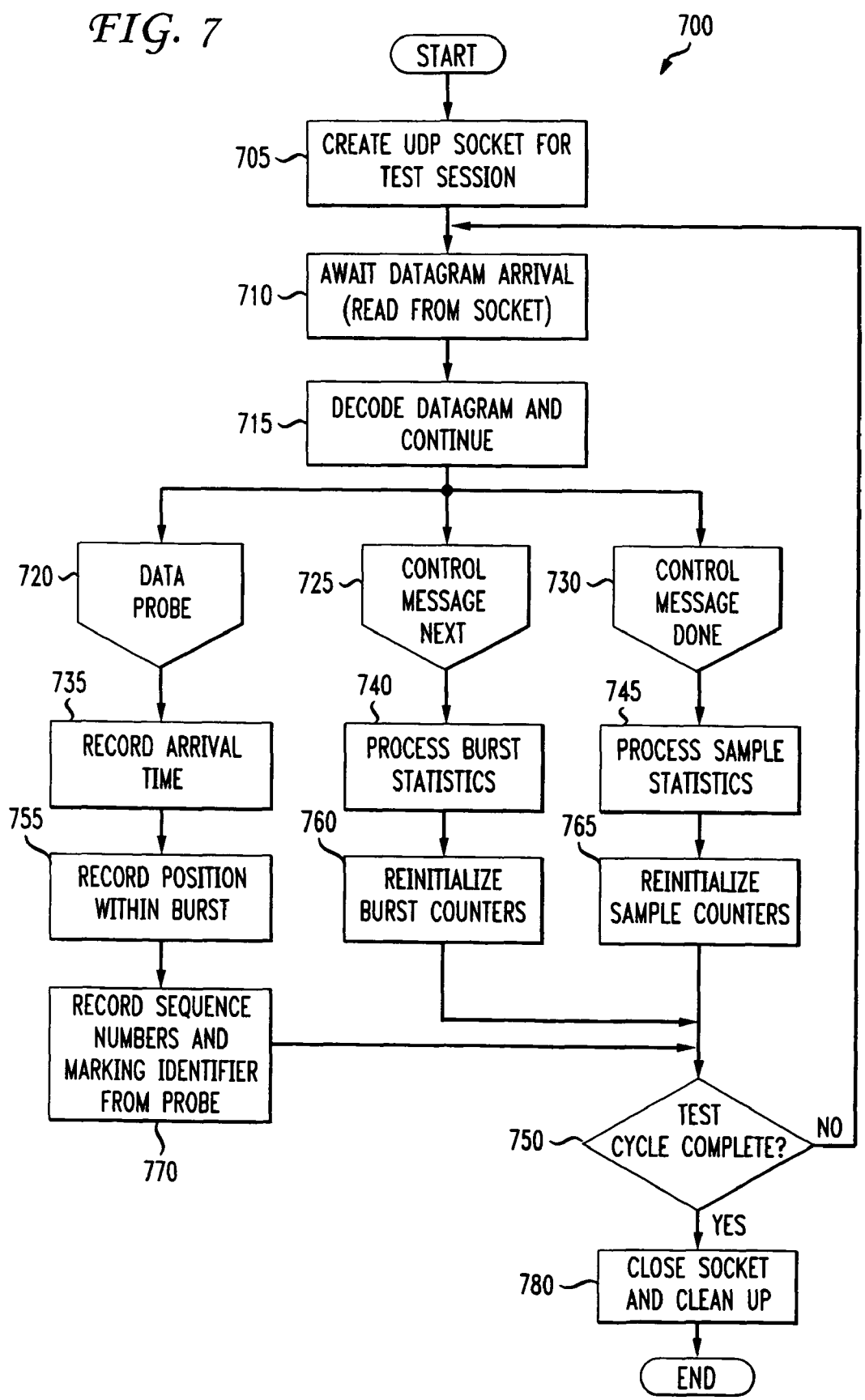

CLASS-BASED DETECTION OF MICROCONGESTION ON QOS-ENABLED LINKS

CROSS REFERENCE TO RELATED APPLICATIONS

This application is a continuation of U.S. patent application Ser. No. 11/517,732, entitled "Class-Based Detection of Microcongestion on QoS-Enabled Links," filed on Sep. 8, 2006 now U.S. Pat. No. 7,656,796, the disclosure of which is incorporated herein by reference in its entirety.

BACKGROUND OF THE INVENTION

The present invention relates generally to detecting transient, small congestion events on links where QoS is utilized to provide differentiated classes of service. More particularly, the present application relates to the ability to monitor the frequency and severity of small congestion events to help identify link capacity issues.

Modern large-scale routers forward packets in hardware and are capable of extremely high switching rates. They typically support OC-48c and OC-192c link speeds with the ability to bundle several physical ports together to form even higher capacity logical links. Higher speed interfaces such as OC-768c are already available and will likely become a reality in a production backbone sometime this year.

One thing that is still common to all these high capacity connections is the need for some amount of output buffering to accommodate traffic fluctuations and bursts. When QoS is enabled on an interface, in the context of this discussion, it means that there are a minimum of two queues available for this purpose. Typically, packets will be classified and placed into one of these queues based on the markings in the packet header (IP Precedence, DiffServ Code Point, MPLS EXP, etc.). When packets arrive in one of these queues at a faster rate than they can be serviced, they will accumulate. In its simplest form, this is the definition of congestion.

A QoS-enabled interface, according to prior art, is shown in FIG. 1. The QoS-enabled interface includes a minimum of two queues available for output buffering to accommodate traffic fluctuations and bursts to the network. The QoS-enabled interface includes a plurality of queues 110, 120, 130 each connected to a network link 100 scheduler 180.

Packets that build up in a queue but are then quickly drained off experience a transient congestion condition that is referred to in this text as microcongestion. The time scale for this type of event may only be a few hundred microseconds. These short periods of congestion, at the higher link speeds listed above, will most likely go unnoticed by end users as well as the monitoring systems designed to watch the network. While this kind of transitory output buffering is considered normal behavior for a router, the ability to detect and quantify these events can help identify undesirable traffic trends before they reach levels where they are potentially problematic. Conversely, this type of measurement could also allow for more controlled use of links at higher utilizations.

Although traditional passive and active measurements provide a considerable amount of network performance data, there are still significant gaps that can be filled. More specifically, it would be highly advantageous to have data at a very early stage indicating when traffic patterns or levels are in fact, and not just statistically, exceeding the available capacity of a link. Although something similar can be done with conventional active measurements, where the network is sampled with ping-like probes, the problem is that these methods usually require that performance be degraded to an undesirable level before detection is possible. This is often well past the threshold where the end user can also detect the condition. On very-high-speed connections these types of noticeable congestion events can represent huge amounts of data and impact entire regions of a network.

Passive performance measurements, via Simple Network Management Protocol (SNMP) polling, are probably the most prevalent form of network monitoring in use today. However, there are numerous shortcomings with passive measurements that must also be dealt with. Relatively frequent measurements, at even 5 minute intervals, are still too sparse to show short duration bursts or sudden traffic shifts. As a result, and to compensate for this lack of granularity, links are often run at a much lower utilization level than they actually need to be.

Another limitation of passive measurements is that in networks with diverse hardware and transport protocols they do not always provide a homogeneous view of true network load levels. Many large-scale backbone networks still utilize early generation hardware even in their newer higher-end platforms. Depending on what feature sets may be enabled, these components are very often not capable of line-rate rate performance. For passive measurements to be accurate they need to account for these situations where link utilizations less than 100% represent the upper limits of the link (i.e., 85% may actually denote 100%). Complicating matters is the fact that as features are enabled or disabled these limits may change.

Given the limitations of traditional passive and active measurement techniques, the detection of microcongestion can significantly contribute to the overall task of performance management. The ability to monitor these types of events can act as an early warning system by detecting true layer-3 congestion at its earliest possible stage. Because it simply reflects the current state of the device's layer-3 queues, it is independent of any inherent hardware limitations or lower-level protocol overhead. It can also play a considerable role in the capacity management of links where it is always desirable to highly utilize what can be extremely expensive resources.

The primary benefit of this type of measurement is its ability to detect transient congestion on even very-high-speed network links. Because the time frames for these types of events can be minuscule at high speeds, this methodology provides a level of visibility that would otherwise be impossible outside of a lab environment. Also, since it does not rely on any specific features or capabilities of the networking equipment itself, it is completely vendor independent. The test bursts are processed through the device as any other traffic would be.

There therefore remains a need for a cost-effective technique to detect and quantify extremely small congestion events on even large-capacity network links.

SUMMARY OF THE INVENTION

The present invention addresses the needs described above by providing a method and an apparatus for measuring congestion in a QoS network. One embodiment is a QoS network wherein QoS is utilized to provide differentiated classes of service by utilizing a plurality of queues including a queue having a highest priority. The network comprises at least one distributed probe server including memory medium comprising machine readable instructions which when executed by a processor, enable the at least one distributed probe server to generate bursts of sample datagrams and to receive the sample datagrams.

At least one distributed probe server may be a transmission probe server and the transmission probe server marks at least one initial datagram in the burst such that it is assigned to the queue with the highest priority. When the highest priority queue is in fact a strict-priority queue, the initial datagram(s) may be omitted. The transmission probe server may further mark a single test datagram in the burst differently whereby it is assigned to a queue other than the highest priority queue. The transmission probe server may also mark the remaining datagrams of the burst so that they are again classified into the highest priority queue where they act as a positional and time reference for the single test datagram. Other than the highest priority queue, this is repeated for each queue being tested.

The transmission probe server may mark each datagram with a probe number to track original transmission order.

At least one distributed probe server may be a receive probe server. The receive probe server may collect the datagram bursts after they have traveled across the network link being probed. The receive probe server may detect the order the datagrams come in so as to detect the test datagram being transmitted out of order in servicing the QoS queues. The receive probe server may record the exact time that each datagram is received in order to detect the test datagram's lateness in servicing the QoS queues.

Another embodiment of the invention is a method for monitoring network congestion on links where QoS is utilized to provide differentiated classes of service by utilizing a plurality of QoS queues including a queue having a highest priority. The method includes the step of monitoring datagram flow in a sample of bursts in order to detect datagrams being transmitted out of order in servicing the QoS queues. For each burst one or more initial datagrams may be marked to assign the datagram to the queue with the highest priority. When the highest priority queue is in fact a strict-priority queue, the initial datagram(s) may be omitted. A single test datagram in the burst is then marked differently from the at least one initial datagram so that it is assigned to another one of the queues. The remaining datagrams of the burst are marked the same as the initial datagrams in order to be assigned back into the first highest priority queue where they act as a positional and time reference for the single test datagram.

The method may further include the steps of marking the datagrams with a sequence number to reflect their position within the burst, and marking the datagrams with a burst count sequence number representing a particular burst within a sample, wherein a sample is comprised of a plurality of bursts, wherein there is one burst for every test datagram.

The sample bursts may be generated by a transmission probe server. The transmission probe server may be a data generating server further providing the function of marking datagrams. The sample bursts may travel from transmission probe server to receive probe server.

Another embodiment of the invention is an apparatus for monitoring transient congestion in a QoS-enabled network. The apparatus comprises at least one transmit probe server configured to generate sample datagram bursts with each datagram in the burst marked to arrive in a particular queue, also marked with sequence identification, and transmitting the sample datagram bursts to the network, and at least one receive probe server configured to analyze the sample datagram bursts received from the transmit probe server to detect datagrams being transmitted out of order in servicing the QoS queues.

The transmit probe server may generate a sample datagram burst including at least one datagram of the burst marked to be classified in a first queue having a highest priority, each datagram of the burst marked with a sequence number relative to position within the burst, each datagram of the burst marked with a burst number representing the burst the packet belongs to, a test datagram marked to be classified in a second queue different from the first queue, remaining datagrams of the burst marked to arrive on the first queue where they are positional references for the test datagram.

The receive probe server may further include a memory medium comprising machine readable instructions which when executed by a processor, enable a receive probe server to collect and analyze the sample datagrams. The receive probe server may measure the delay of the test datagram arrival relative to other datagrams arrival in the burst. The receive probe server may compare the reference datagram position and arrival time to the test datagram position and arrival time within a burst. The receive probe server may record the order the packets arrive so as to detect packets being transmitted out of order in servicing the QoS queues.

BRIEF DESCRIPTION OF THE DRAWINGS

FIG. 7 is a receive probe server flow according to one embodiment of the invention.

DETAILED DESCRIPTION

The inventor has developed a method and apparatus for detecting microcongestion on links where QoS is utilized to provide differentiated classes of service.

The invention creates some datagrams as data and others as control messages. The datagrams constructed as data are referred to as probes and consist of counters and markers. Each of these contain a sample sequence number which is used to indicate a reference to the sample, the burst sequence number which is used to indicate a burst within a sample, the probe sequence number which is used to indicate the position of a probe within a burst, and the marking identifier which is used to indicate the class or priority of the datagram. The marking identifier is normally the packet marking (IP Precedence or Differentiated Services Code Point (DSCP)) copied into the packet payload/data field.

Obtaining this type of measurement involves generating a burst of data with one packet marked in such a way as to purposely cause it to be processed through a different queue than the rest of the burst. Upon reception, the characteristics of the uniquely marked packet relative to the rest of the burst can be used to estimate transient congestion conditions that may have existed at the time that they were serviced.

Figure 1:
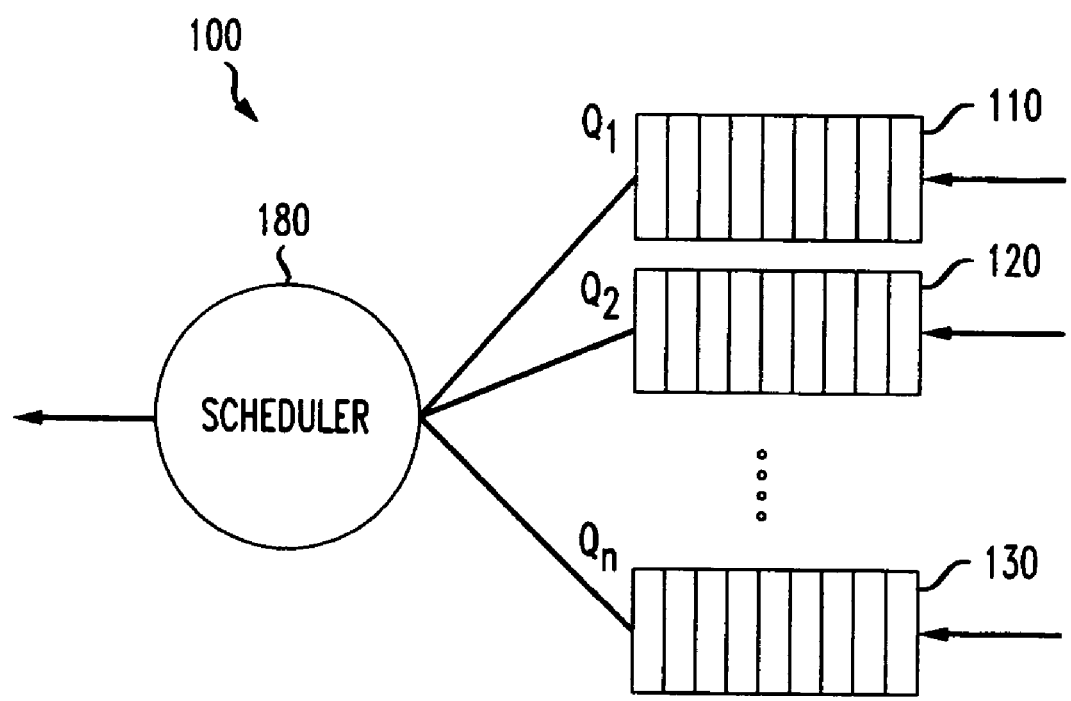
FIG. 1 is a schematic of a prior art QoS-enabled interface.
Figure 2:
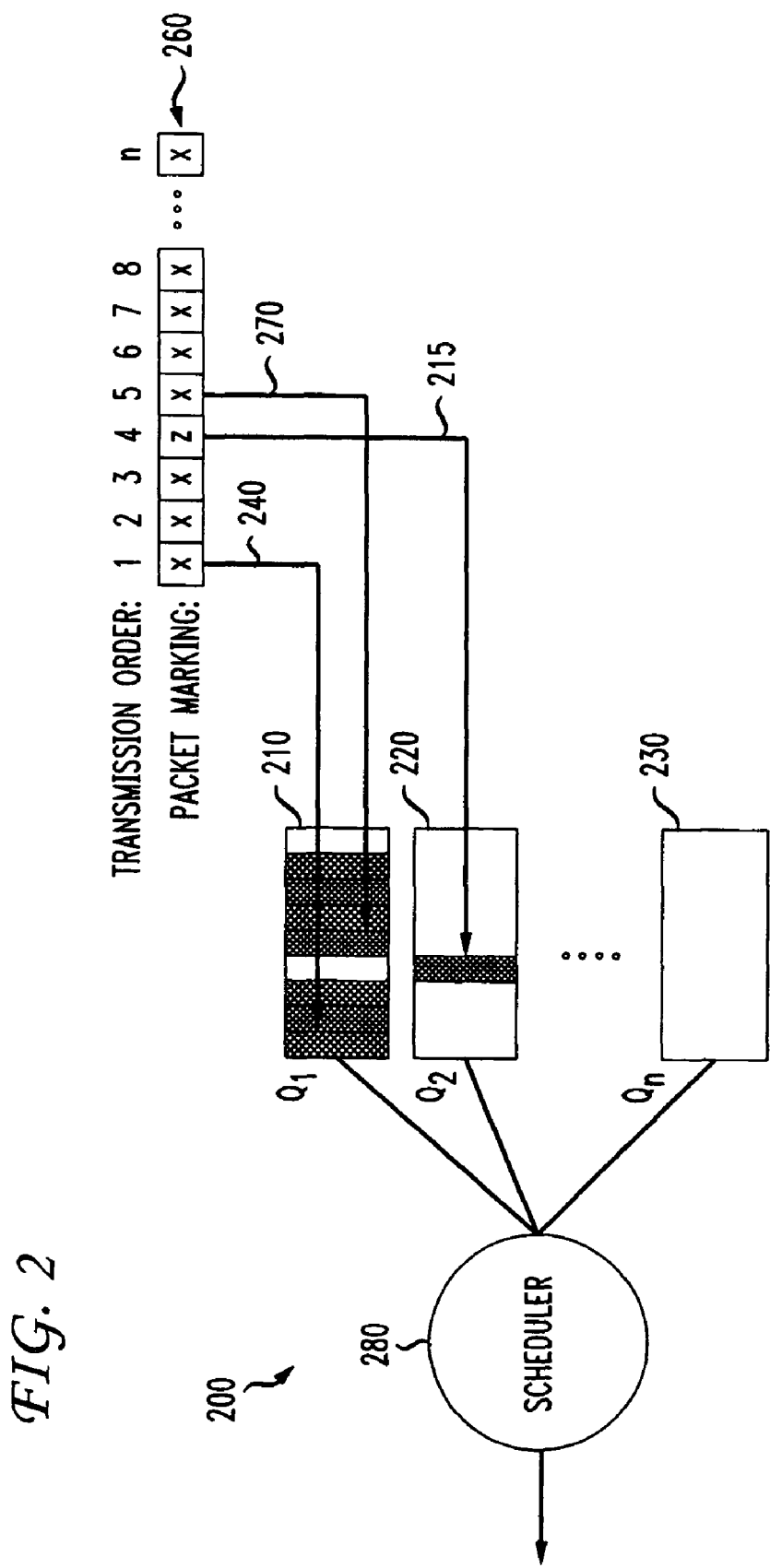
FIG. 2 is a schematic representation of burst processing according to one embodiment of the invention.

FIG. 2 shows the arrival time of the burst by queue position when processing the burst on a link 200 in accordance with one embodiment of the invention. Ordinarily, when packets are marked (or remarked) and subsequently classified, care must be taken to ensure that packets of a single flow do not end up in different queues 210, 220, 230 on any individual link. This is required because as they are transmitted across QoS-enabled interfaces the servicing of the various queues may result in the packets being transmitted out of order. This normally undesirable behavior is in fact the basis for detecting and measuring microcongestion.

Similarly marked packets 270, 240 end up on the same queue, $Q_1$ 210. The scheduler 280 manages and collects the packets from the queues. Normally, when there is no link congestion and queue occupancy is essentially zero the scheduler will drain packets out of the queues at their arrival rate. If a burst of packets arrive and the service time plus insertion time of each individual packet is less than the time between packets (the inter-packet gap), they will be transmitted on the link 200 in their original order even though they were processed through different queues. Later, brief periods of link congestion and the resulting buildup of packets within one or more queues will disrupt this process flow and subsequently impact the order of transmission.

Obtaining this type of measurement involves generating a burst of data 260 with one packet 215 marked in such a way as to purposely cause it to be processed through a different queue, $Q_2$ 220 than the rest of the burst 260. Upon reception, the characteristics of the uniquely marked packet relative to the rest of the burst can be used to estimate transient congestion conditions that may have existed at the time that they were serviced.

The burst pattern for this type of measurement starts with one or more reference packets marked such that they get classified into the queue with the highest priority, shown as $Q_1$ 210 in FIG. 2. When this queue is a strict-priority queue the initial reference packets can actually be omitted. A single test packet 215 would then be marked differently so that it would end up in one of the other queues looking to be sampled, $Q_2$ 220 in this case. The remaining packets of the burst would then be classified back into the first queue having the highest priority 210 where they will continue to act as a positional/time reference for the test packet. With this approach, the time period in which microcongestion events can be detected is simply a function of the size and spacing of the burst itself. Also, because all of the time measurements are relative to the burst there is no requirement for synchronized time between the source and destination.

Figure 3:
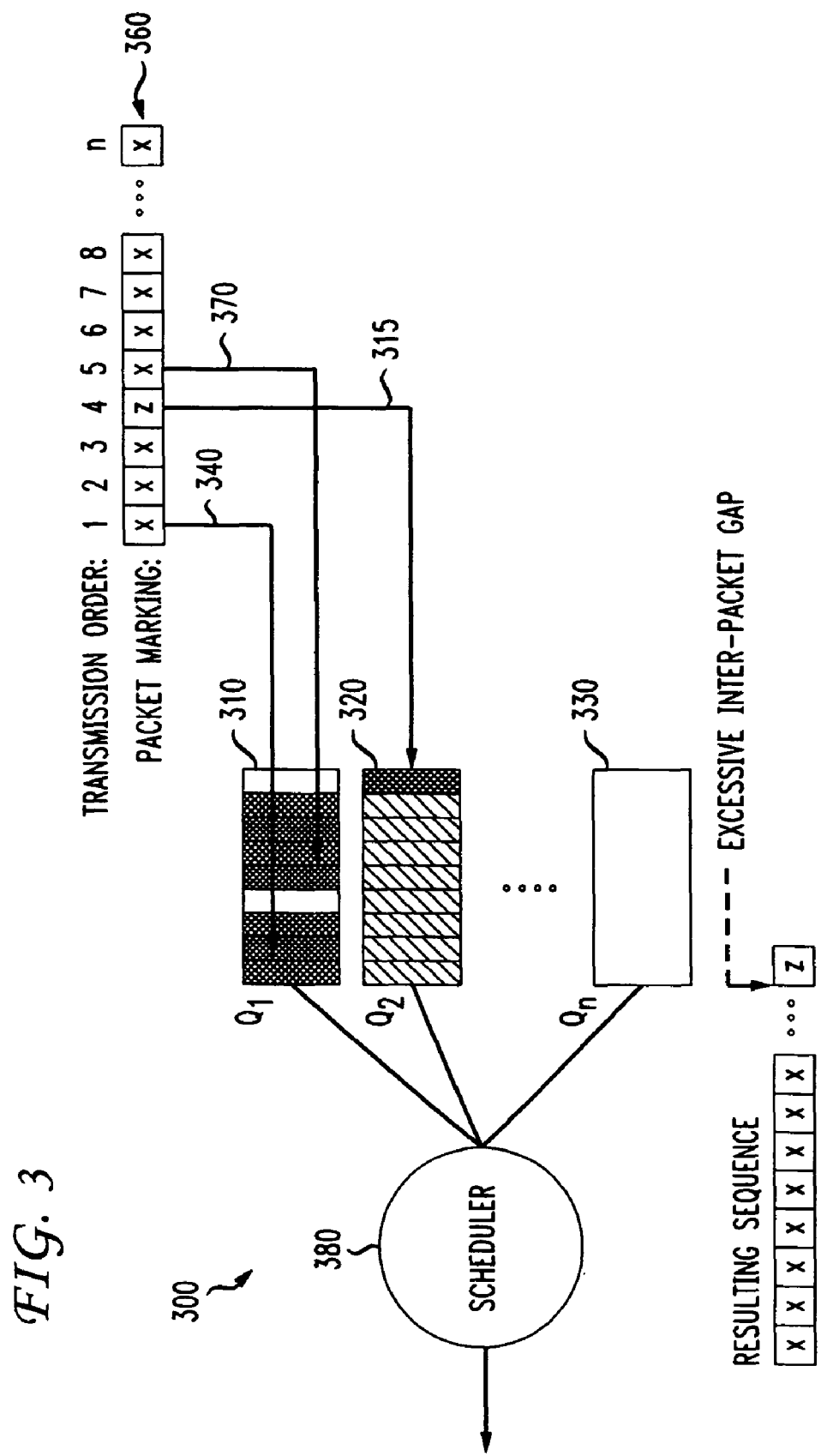
FIG. 3 is a microcongestion event according to one embodiment of the invention.

FIG. 3 shows the arrival time of the burst by queue position during a microcongestion event. In the burst processing of FIG. 3, elements corresponding to those of FIG. 2 have element numbers in increments of 100. A minor microcongestion event may only result in a reordering of the original sequence with no discernable increase in the overall burst duration or inter-packet gap. A more significant event would likely be accompanied by a measurable increase in both of these. For microcongestion events to occur, relative to a specific queue, two things must be true. First, the aggregate capacity of the link must be exceeded even for an instant. This includes those situations where the limiting factor is the hardware itself and not necessarily the quantity of bits on the wire. Second, the packet arrival rate into a queue must exceed its service rate (i.e., both the link 300 and queue 320 must be overloaded).

The primary benefit of this type of measurement is its ability to detect transient congestion on even very-high-speed network links. Because the time frames for these types of events can be minuscule at high speeds, this methodology provides a level of visibility that would otherwise be impossible outside of a lab environment. Also, since it does not rely on any specific features or capabilities of the networking equipment itself, it is completely vendor independent. The test bursts are processed through the device as any other traffic would be. Arrival time is shown by queue position in 310, 320.

Figure 4:
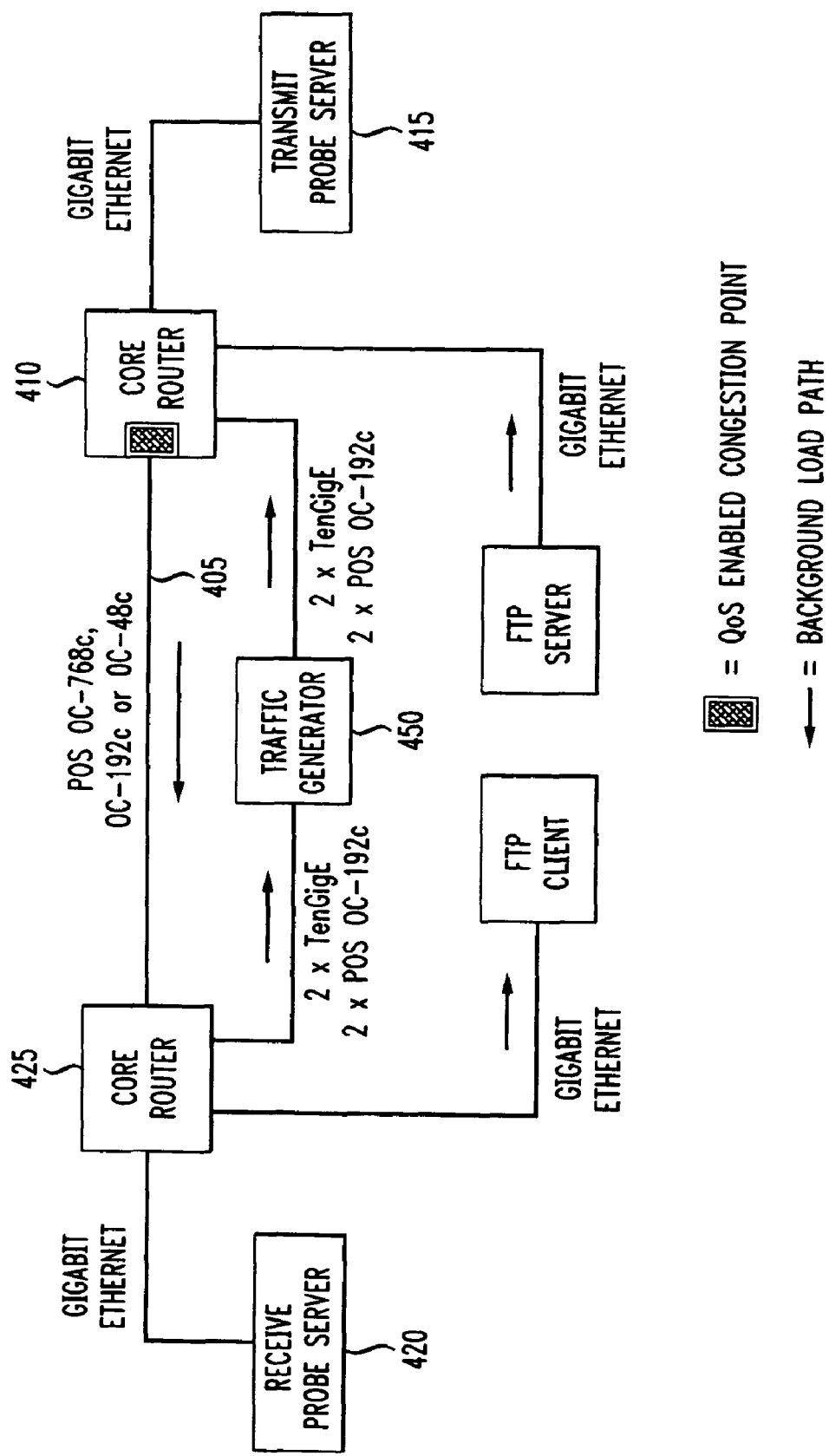
FIG. 4 is a laboratory setup according to one embodiment of the invention.

FIG. 4 shows a lab setup for an example of how in practice microcongestion could be detected and quantified. A pair of Linux servers 415, 420 is used to source and sink probe bursts. These measurement servers 415, 420 are connected via Gigabit Ethernet to a pair of core routers 410, 425. The routers 410, 425 are connected to each other via a backbone link 405. A traffic generator 450 is attached to both core routers 410, 425 to create background load. For various scenarios, different backbone link speeds and separate QoS policies were utilized. For this example only one interface, the congestion point, is QoS-enabled.

Figure 5:
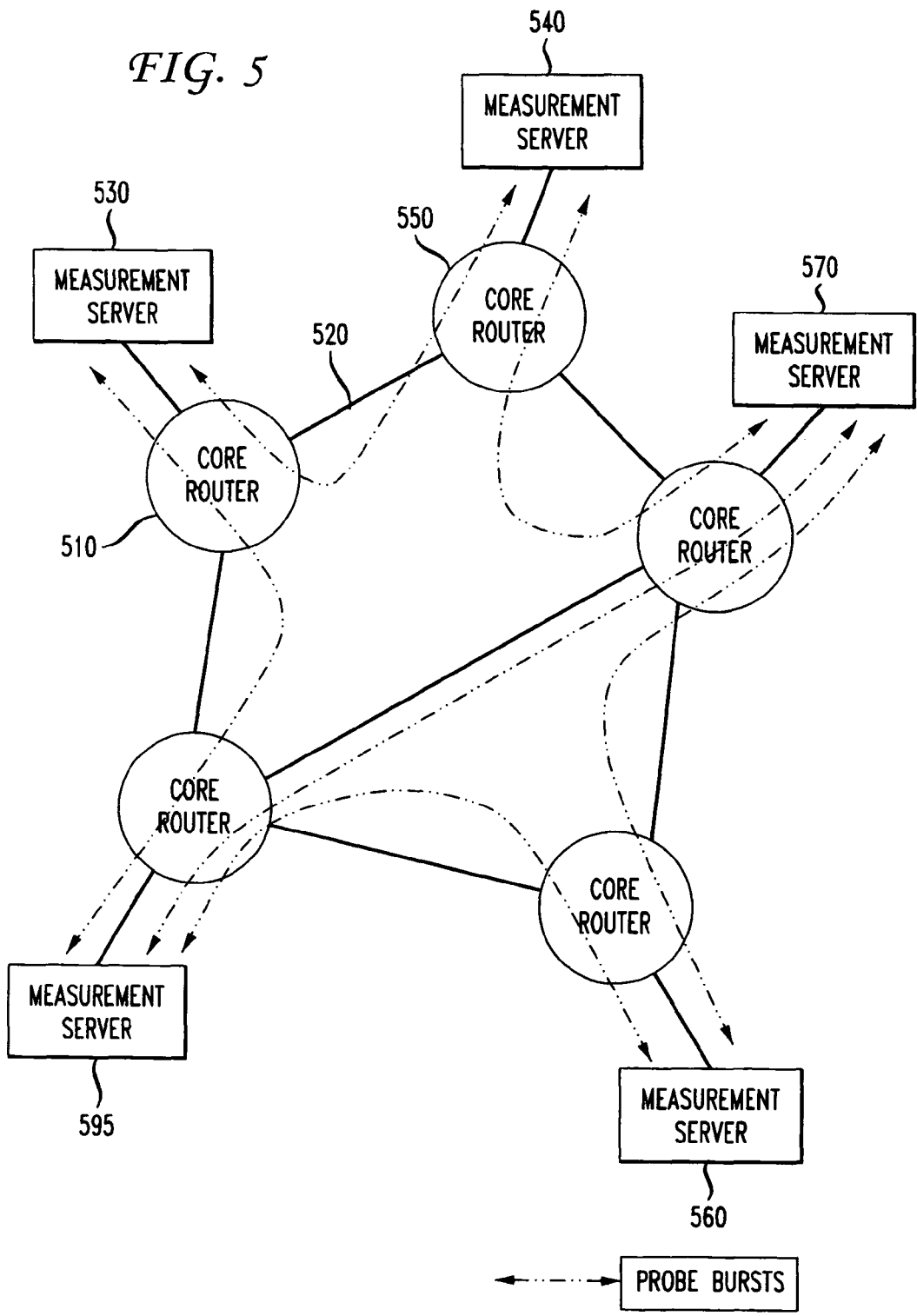
FIG. 5 is an example of connectivity and link coverage.

The traffic generator is configured to generate uniformly distributed random size packets from 40 to 1500 bytes for each QoS class. The mean packet rate, regulated via a geometrically distributed random send interval, is adjusted to cause various degrees of congestion for each of the classes. The overall objective is to create enough traffic to cause minor levels of transient congestion without the condition being significant enough to cause packet loss. That is, the source could remain active indefinitely without causing any queues to actually overflow. Using the configuration shown in FIG. 4, the inventor has demonstrated that the apparatus and method of the invention are capable of detecting and measuring microcongestion. FIG. 5 shows a hypothetical view of a consumer or business network with measurement servers 530, 540, 570, 560, 595 in place to detect and monitor microcongestion between directly connected core routers. While the lab instantiation model discusses the transmit server and receive server functions implemented on two distinct servers, a model can be implemented with both transmit and receive server functions present on a single server (as shown in FIG. 5). As an example, servers 530, 540 form one test pair which are used to source and sink probe bursts to each other bidirectionally between the core routers 550, 510. This allows detection of microcongestion in either direction across the link 520. This type of consolidation can be further extended to where a single server can support several test sessions at once and act as a source and sink point for numerous other servers simultaneously (also shown in FIG. 5).

Figure 6:
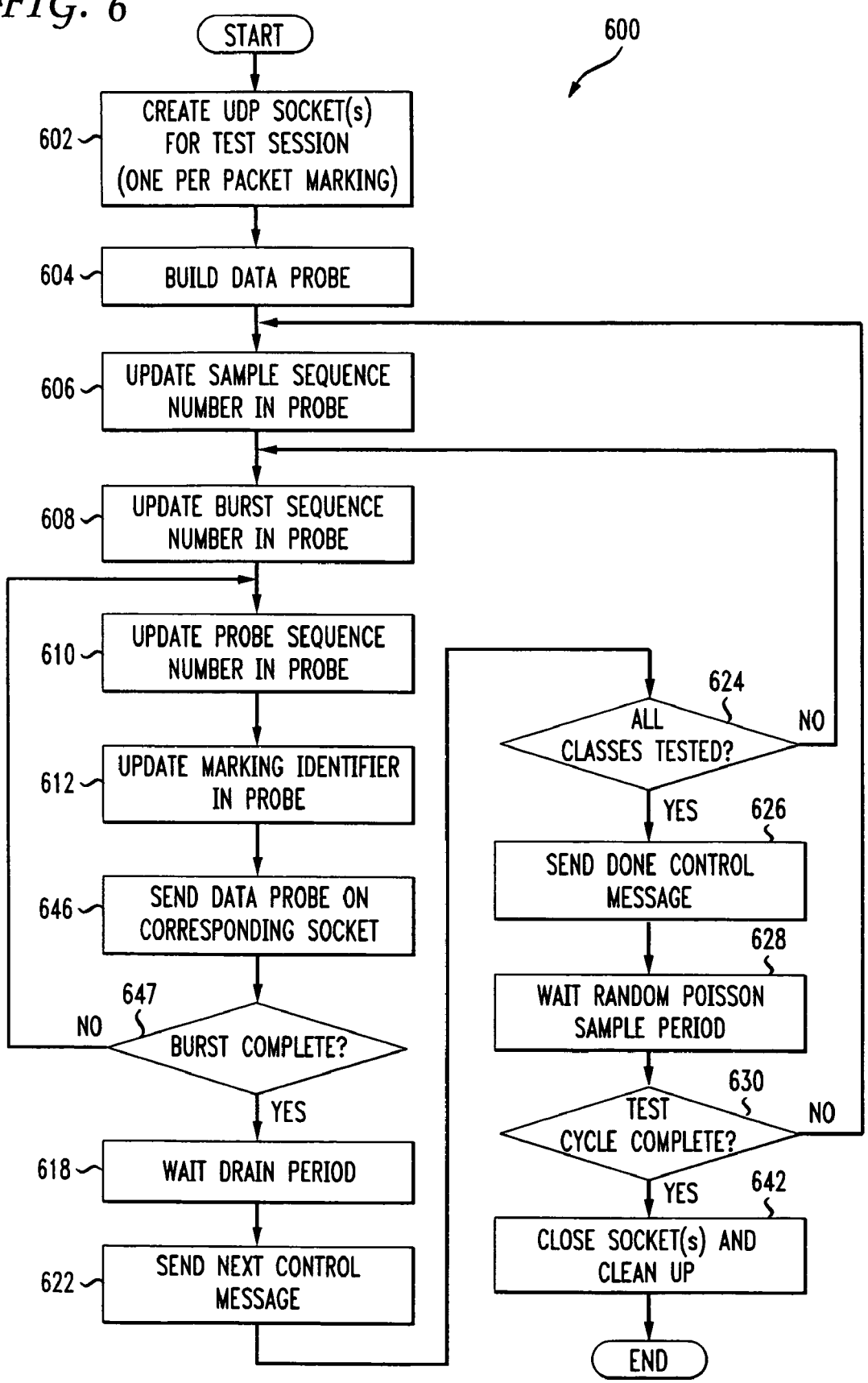
FIG. 6 is a transmit probe server flow according to one embodiment of the invention.

An exemplary method according to one embodiment of the invention is described with reference to the flow chart of FIG. 6. As an initial setup 600 the server is configured with standard network parameters (IP address, default gateway, etc.) and connectivity (e.g., a Gigabit Ethernet NIC). For this method the operating system for the prototype was Linux but could be virtually anything depending on the scale requirements (i.e., the number of simultaneous test sessions). The prototype code uses standard Unix sockets to generate the packet bursts.

In a first step 602 of the method a UDP socket is opened for the reference packets and one additional UDP socket is opened for each of the test packet markings. An alternative implementation for this step is to open a single raw socket and directly manipulate the Type-of-Service (ToS) byte in the IP header.

In the next steps a data probe 604 is built containing a sample sequence number (to track total samples) 606, a burst sequence number (to track bursts per sample) 608, a probe sequence number (to track original transmission order) 610 and a marking identifier (reflecting the packet marking) 612.

A 'for' loop 646, 647 is then used to send twelve probes (eleven reference probes and one test probe) as close together as possible for a single burst (i.e., QoS traffic class).

A short drain period (50 ms) 618 is used to allow time for the probes to finish and then a NEXT control message 622 is sent indicating the burst is complete and another may follow. Steps 608 through 622 are then repeated in the main loop, including the inner loop, for each of the classes 624 (a total of three in the prototype). A DONE control message 626 is sent indicating to the receiver that the last burst has been sent. A Poisson wait interval 628 with a mean of 1 second is used to randomize the sampling. An arbitrary value of 1 second was chosen for the prototype, but any value could be used. The process then repeats at step 606 for the duration of the desired test period 630. The Transmit Probe Server does keep track of the time required to transfer the probes within each burst as an operational sanity check. The final step 642 is to close the sockets and clean up the transient data.

FIG. 7 shows Receive Probe Server functionality that processes the datagram received from the Transmission Probe Server. This server is configured 700 the same as the Transmission Probe Server with the corresponding network parameters for that device. Once started the code would as a first step 705 opens a single UDP socket to receive all data probes and control messages. In a next step 710 the code would read a datagram from the socket. In a further step 715 the code would take action based on contents of the received datagram.

If a data probe (either the test probe or one of the reference probes) 720 was received, the code would record its arrival time 735 and position within burst 755 as well as all sequence numbers and the marking identifier from the probe 770. If a NEXT control message 725 was received the code would process burst statistics 740 and reinitialize for the next burst 760. If a DONE control message 730 was received the code would process sample statistics 745 and reinitialize for next sample 765. In a next step 750 the code would continue to return to step 710 and process the next datagram till the test cycle is complete 750. As a final step the code would close the socket and cleanup 780.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to a prototype Transmission Probe server and Receive Probe server, the method and apparatus of the invention may be instead embodied by a stand-alone apparatus that is connected to a network through a pair of core routers, for example. It is further noted that the invention is not limited to use with OC-48c, OC-192c or OC-768c link types, as described in this specification, but can be used with any high speed link technology existing today or developed in the future. It is to be understood that the embodiments shown and described herein are only illustrative of the principles of the present invention and that various modifications may be implemented by those skilled in the art without departing from the scope and spirit of the invention.

What is claimed is:

1. A quality of service network wherein quality of service is used to provide differentiated classes of service by using a plurality of queues that include a first queue having a highest service priority comprising:

a transmit probe server configured to generate a probe burst and transmit the probe burst over the quality of service network, the probe burst comprising:

a test probe having a sequence number that indicates the test probe's transmitted position in the probe burst and a marking identifier that indicates that the test probe's service priority is assigned to a queue less than the first queue; and a plurality of reference probes, each reference probe having a sequence number that indicates the reference probe's transmitted position in the probe burst and a marking identifier that indicates that each reference probe's service priority is assigned to the first queue;

a receive probe server configured to receive the probe burst, record the arrival time and received position of the test and reference probes in their assigned queue service priorities, and from the test and reference probe's queue service priority positions, determine if a microcongestion event occurred based on the test probe queue service priority position relative to the reference probe's positions in the first queue service priority;

wherein a microcongestion event results in a reordering of the original probe burst's test and reference probe sequence when received at the receive probe server with no increase in overall burst time duration or inter-packet gap.

2. The quality of service network according to claim 1 wherein the recorded test and reference probe's arrival times are relative to the probe burst when received.

3. The quality of service network of claim 1 wherein each test and reference probe in a probe burst further comprises a probe burst number to identify the probe burst.

4. The quality of service network of claim 1 wherein the received reference probes act as a temporal reference for the test probe.

5. The quality of service network of claim 1 wherein the time period in which a micro congestion event is detected is a function of the number of test and reference probes in a probe burst and the time interval between each test and reference probe when received.

6. The quality of service network of claim 5 wherein for a microcongestion event to occur relative to a specific queue service priority, an aggregate quality of service network link capacity over which the probe burst is transmitted is exceeded and the test and reference probe's arrival rate into their specific queue service priority exceeds their specific queue service priority's service rate.

7. The quality of service network of claim 1 wherein the transmit probe server and the receive probe server are collocated.

8. The quality of service network of claim 1 wherein the transmit probe server and the receive probe server are the same server.

* * * * *